United States Patent [19]

Steinbusch

[11] Patent Number: 6,118,244

[45] Date of Patent: Sep. 12, 2000

[54] CIRCUIT ARRANGEMENT FOR POWERING AN ELECTRIC MOTOR

[75] Inventor: Hans Steinbusch, Landgraaf, Netherlands

[73] Assignee: U.S. Philips Corporation, New York, N.Y.

[21] Appl. No.: 09/328,026

[22] Filed: Jun. 8, 1999

[30] Foreign Application Priority Data

Jun. 9, 1998 [DE] Germany ............ 198 25 722

[51] Int. Cl.[7] .................................... G05B 19/29
[52] U.S. Cl. ............... 318/603; 318/600; 318/601; 318/602
[58] Field of Search .................... 318/138, 245–296, 318/560–696

[56] References Cited

U.S. PATENT DOCUMENTS

| Re. 30,938 | 5/1982 | Kallen | 318/577 |
|---|---|---|---|
| 4,049,962 | 9/1977 | Kallen | 318/577 |
| 4,216,419 | 8/1980 | van Dam et al. | 318/327 |
| 4,250,435 | 2/1981 | Alley et al. | 318/138 |
| 4,928,043 | 5/1990 | Plunkett | 318/254 |
| 5,210,726 | 5/1993 | Jackson et al. | 369/32 |
| 5,350,882 | 9/1994 | Koguchi et al. | 84/636 |
| 5,793,173 | 8/1998 | Henschel et al. | 318/467 |

FOREIGN PATENT DOCUMENTS

| 0156282A1 | 10/1985 | European Pat. Off. . |
|---|---|---|
| 0231046B1 | 8/1987 | European Pat. Off. . |
| 3712185A1 | 10/1987 | Germany . |
| 3709168A1 | 9/1988 | Germany . |

*Primary Examiner*—Paul Ip
*Attorney, Agent, or Firm*—Bernard Franzblau

[57] ABSTRACT

A circuit arrangement for powering an electric motor having at least three windings from a direct voltage source via a commutation circuit which, for each winding terminal of the electric motor, comprises a commutation branch including a first and a second switching element by which the relevant winding terminals can be connected selectively to a first terminal of the direct voltage source or, via a measurement impedance, to a second terminal of the direct voltage source. A ring counter device periodically changes over the switching elements of the commutation circuit in accordance with a signal series which is cycled through the ring counter device under control of a clock signal, one period of the ring counter device corresponding to one complete cycle of the signal series through the ring counter device. A clock frequency generating stage supplies the clock signal whose clock frequency is dependent on the measurement voltage. A motor-current dependent commutation which operates reliably for all operating conditions of the motor, particularly all speeds, using a circuit of low complexity, is obtained in that a sample and hold circuit has an input coupled to the measurement impedance in order to sample a measurement voltage appearing across the measurement impedance and in that the ring counter device, in each of its periods, controls the sample and hold circuit so as to acquire a sampled value of the measurement voltage at a presettable instant outside the time interval for the change-over of the switching elements of the commutation circuit.

14 Claims, 4 Drawing Sheets

CIRCUIT ARRANGEMENT FOR POWERING AN ELECTRIC MOTOR

BACKGROUND OF THE INVENTION

This invention relates to a circuit arrangement for powering an electric motor having at least three windings from a direct voltage source via a commutation circuit which, for each winding terminal of the electric motor, comprises a commutation branch including a first and a second switching element by which the relevant winding terminals can be connected selectively to a first terminal of the direct voltage source or, via a measurement impedance, to a second terminal of the direct voltage source, the circuit arrangement having a ring counter device for periodically changing over the switching elements of the commutation circuit in accordance with a signal series which is cycled through the ring counter device under control of a clock signal, one period of the ring counter device corresponding to one complete cycle of the signal series through the ring counter device, and having a clock frequency generating stage for supplying the clock signal whose clock frequency is dependent on the measurement voltage.

Electronically commutated d.c. motors are known which are equipped with position sensing elements, particularly Hall elements, for the movable armature of the motor. Since these position sensing elements are stationary the angle between the armature voltage and the electromotive force (EMF) of the motor is fixed for all loads. Moreover, such position sensing elements impose undesired limits on the simplification and miniaturization of electronically controlled d.c. motors.

Another improved method for the commutation of the coils of a d.c. motor is obtained if a commutation frequency can be generated in dependence on the motor current. For this purpose, the motor current is measured by means of a series resistor having a low resistance in the supply line to the commutator. In order to draw any conclusions about the (mean) power of the motor from the measurement of the motor current, the arithmetic mean of the voltage measured across the series resistor, i.e. the motor current, is formed. From this mean value of the measured voltage a frequency proportional to this voltage can be derived with the aid of a voltage-frequency converter, the d.c. motor being commutated on the basis of this frequency.

However, it has been found that for the correct operation of such a circuit arrangement, i.e. for the correct commutation of the d.c. motor, the formation of the arithmetic mean for all the motor speeds between standstill of the motor and the maximum speed is very intricate from the point of view of circuit engineering. Commercially available circuits allow, for example, an arithmetic mean formation between two limit frequency values which are in a ratio of 50:1 to one another. If the upper limit frequency is assumed to correspond to the maximum speed of the d.c. motor this results in a range of lower speeds which cannot be handled or at least cannot be handled correctly by means of such an arrangement.

From EP 0 156 282 a method of and an arrangement for controlling a brushless d.c. motor are known, which motor is driven by an inverter circuit connected to a d.c. source. The direct current applied to the inverter circuit is measured. The measurement signal resulting from this measurement is processed to a peak value signal in a peak value detector for the detection of positive current peaks, which signal is applied to a first controller in order to generate a frequency control signal. This controller reduces the value of the frequency control signal when the peak value of the motor current exceeds a given value. From the frequency control signal a clock signal is derived via a voltage-controlled oscillator, whose frequency, via a frequency divider and a ring counter, forms the basis for the commutation of the a.c. motor by means of the inverter circuit. Moreover, a mean value is generated from the measurement signal derived from the motor current and the mean value signal thus generated is divided by the frequency control signal in order to obtain a speed demand signal. Furthermore, a second voltage control signal, which should be a measure of the magnetization of the motor and which corresponds to the negative current peak of the motor current, is derived from the measurement signal in a second peak value detector. From the difference between the speed demand signal and the second voltage control signal a pulse width control signal is derived. In a pulse width control stage (timer) the pulse width of the clock signal from the voltage-controlled oscillator is controlled by means of this pulse width control signal. A logic circuit comprising a plurality of logic gates combines the commutation signals from the ring counter and the timer so as to form control signals for the inverter stage. For the starting phase and the braking phase of the motor the controller, to which the peak value signal from the first peak value detector (positive current peaks) is applied, further has a control input to which a ramp signal is applied from a speed demand input via a ramp generator. This ramp signal reduces the value of the frequency control signal in the starting phase and the braking phase, as a result of which the voltage-controlled oscillator generates a gradually increasing frequency in the starting phase and a gradually decreasing frequency in the braking phase.

This arrangement includes not only the afore-mentioned mean-value forming means with the said drawbacks but also a very large multi-section control loop, which results in a very complicated arrangement. Apart from the consequently greater likelihood of parasitic oscillations, the commutation frequency in the known arrangement is derived from the peak values of the motor current, which itself may already be susceptible to substantial interference and fluctuations.

From DE 37 09 168 A1 a circuit arrangement is known for powering a multiphase synchronous motor from a d.c. mains. This circuit arrangement comprises a switching device for successively connecting the individual winding phases of the armature winding of the motor to the d.c. mains voltage, a switching signal generator for generating switching signals for the switching device, and a logic stage for applying the switching signals to the switching device in the correct sequence. In order to simplify the circuit arrangement, without a rotor position sensor being used, the switching signal generator is formed by a voltage-to-frequency converter, a starting section and restarting unit, which is active once the motor has run up to speed. The voltage-to-frequency converter generates a squarewave pulse series having a pulse repetition frequency, which depends on its input voltage and is raised from zero to a given value by starting of the starting section. The starting section is started upon application of the d.c. mains voltage and by the restarting unit when the motor current exceeds a given value.

In this circuit arrangement the motor speed tracks a frequency which is determined by a fixed voltage and which is independent of the load and the operating condition of the motor. If the motor speed falls out of step with this frequency this operating condition is detected by an increase of the motor current beyond a given limit value. After a given time a frequency which increases gradually from a small value is then applied so as to allow the motor to restart. Controlling in accordance with the measured motor current is not effected.

From DE 37 12 185 a load current detection device for current inverters with pulse width modulation is known. Such a current inverter has a plurality of branches in parallel with a direct voltage source. Each branch has an upper section and a lower section, which each include a switching element. The switching elements of each upper section and of each lower section continuously and alternately receive switching control signals. Shunt resistors are interposed between a negative terminal of the direct voltage source and the switching elements of the lower arms. The current inverter further comprises a nominal current waveform generator, which generates guidance values for the current waveforms to be fed into a load, a carrier wave generator, and sample and hold circuits. Each of the sample and hold circuits samples a voltage produced across the relevant shunt resistor in synchronism with the period of the carrier wave generated by the carrier wave generator, at a given instant during the time interval in which the associated switching element is conductive, and holds this voltage. For this purpose, a reference value signal generator circuit has been provided, which supplies a reference value signal. A comparator circuit compares this signal with the output signal of the carrier wave generator. If the output signal of the carrier wave generator exceeds the output signal of the reference value signal generator circuit, i.e. the reference value signal, the sampled signals are held in the sample and hold circuits.

Thus, in the device known from DE 37 12 185 A1 the currents in the individual branches of the current inverter are measured separately and are controlled separately for each branch by a multiple control loop for each nominal current waveform. This device also requires a complex circuit arrangement.

From the European Patent 231 046 a commutation circuit for a collectorless d.c. motor without commutation sensor is known, which comprises a stator with a multi-phase system and a permanent-magnet rotor. The commutation state of the motor depends on the voltages induced in the stator windings. A comparison signal is generated which indicates whether the sign of that winding voltage which is not connected to a direct current source by means of the electronic switching elements is in conformity with a predetermined sign which depends on the instantaneous commutation state. This comparison signal is inhibited during those time intervals in which transient effects which may cause spurious zero crossings occur in the windings as a result of the electronic switching elements being turned off. The switching elements are always switched one commutation step further if the comparison signal does not have the appropriate signal. The voltage dependent commutation is an alternative for the current dependent commutation, but this is not always desired.

SUMMARY OF THE INVENTION

It is an object of the invention to provide a circuit arrangement for powering an electric motor which allows a motor-current dependent commutation without position sensor elements, which operates reliably for all operating conditions of the motor, particularly all speeds, using a circuit of low complexity.

According to the invention this object is achieved in a circuit arrangement of the type defined in the opening paragraph, in that a sample and hold circuit has an input coupled to the measurement impedance in order to sample a measurement voltage appearing across the measurement impedance and in that the ring counter device, in each of its periods, controls the sample and hold circuit so as to acquire a sampled value of the measurement voltage at a presettable instant outside the time interval for the change-over of the switching elements of the commutation circuit.

The invention is based on the recognition of the fact that instead of a motor current mean value, which may be difficult to generate, information about the motor load can also be provided by an instantaneous value of the motor current sampled at a suitably selected instant. It appears that at the commutation points, i.e. at the instants at which the switching elements of the commutation branches are changed over, the motor current cannot provide reliable information about the motor load owing to the transients produced in the windings of the electric motor by these switching operations and owing to asymmetries in the commutation circuit, and the motor current should therefore not be measured at these instants. However, outside the time in which said disturbing factors occur it is possible to find an instantaneous value of the motor current which is at least substantially proportional to the motor load. A suitable sampling instant at which the instantaneous value of the motor current meets the afore-mentioned requirements lies in the center of a commutation interval. At said instants switching and transient effects have no influence, i.e. the time intervals for changing over the switching elements of the commutation circuit do not extend up to these sampling instants.

The commutation of a d.c. motor by means of a circuit arrangement in accordance with the invention, which no longer requires averaging, now for the first time allows the use of certain forms of control for the d.c. motor. In particular, there is now a simple possibility of synchronizing the d.c. motor.

A particularly simple circuit arrangement for determining said sampling instant is obtained in that the ring counter device is formed by a shift register and has a number of register cells which corresponds to at least twice the number of switching elements of the commutation circuit. If twice as many register cells as switching elements are selected the sampling instants can be centered between two commutation instants by simply selecting the register cell by which sampling is to be started. These commutation instants represent the beginnings of the time intervals for the change-over of the switching elements. When a greater number of register cells is selected the sampling instants, i.e. the instants at which a sampled value of the measurement is to be determined, can also be situated at another instant between two commutation instants without significantly complicating the circuit arrangement.

Preferably, a time interval between every two successive change-over operations of the switching elements of the commutation circuit, i.e. a time interval between two successive commutation instants, corresponds to two periods of the clock signal, and the activation of the sample and hold circuit is started by an edge of the clock signal within said time interval. In the most general form of the ring counter device every $n^{th}$ register cell of said device is connected to one of the switching elements of the commutation circuit, n being the quotient of the total number of register cells of the ring counter device and the number of switching elements. A sampling signal for starting a sampling operation in the sample and hold circuit is acquired from a register cell which, in the shift register, is situated between two successive register cells which are each connected to one of the switching elements of the commutation circuit.

For acquiring a pulse-shaped sampling signal from the ring counter device the circuit arrangement in accordance with the invention preferably comprises a pulse shaper stage. As a result of this, the waveform of the sampling signal will be independent of the operating condition of the electric motor.

In an advantageous manner the circuit arrangement in accordance with the invention can simply be provided with an input circuit for storing at least one presettable signal series and for the input of this signal series, preferably for the non-recurrent input of this signal series into the ring counter device when the circuit arrangement is put into operation. When the electric motor is switched on such an input circuit can load the ring counter device with different presettable signal series, i.e. different switching-state patterns for the register cells of the ring counter device, which enable the electric motor to be operated with different commutation patterns. In particular, this enables the current flow angle for the windings of the electric motor to be preselected.

The circuit arrangement in accordance with the invention can also be used in a simple manner for speed control of the electric motor connected to it. For this purpose, the sample and hold circuit in a further embodiment of the invention includes a control stage for controlling the speed of the electric motor at a presettable value, which can be applied to the control stage as a nominal current value. The control stage includes a comparator circuit for generating a comparison signal by comparing the nominal current value with the sampled values of the measurement voltage. The comparison signal is applied to the clock frequency generating stage in order to derive the clock signal.

The circuit arrangement in accordance with the invention is preferably employed for simple electrical drive systems using electronically commutated electric motors. A preferred field of use of such electric motors are domestic appliances, for example electric shavers.

BRIEF DESCRIPTION OF THE DRAWINGS

In the drawings like elements bear the same reference symbols.

DESCRIPTION OF THE PREFERRED EMBODIMENTS

Figure 1:
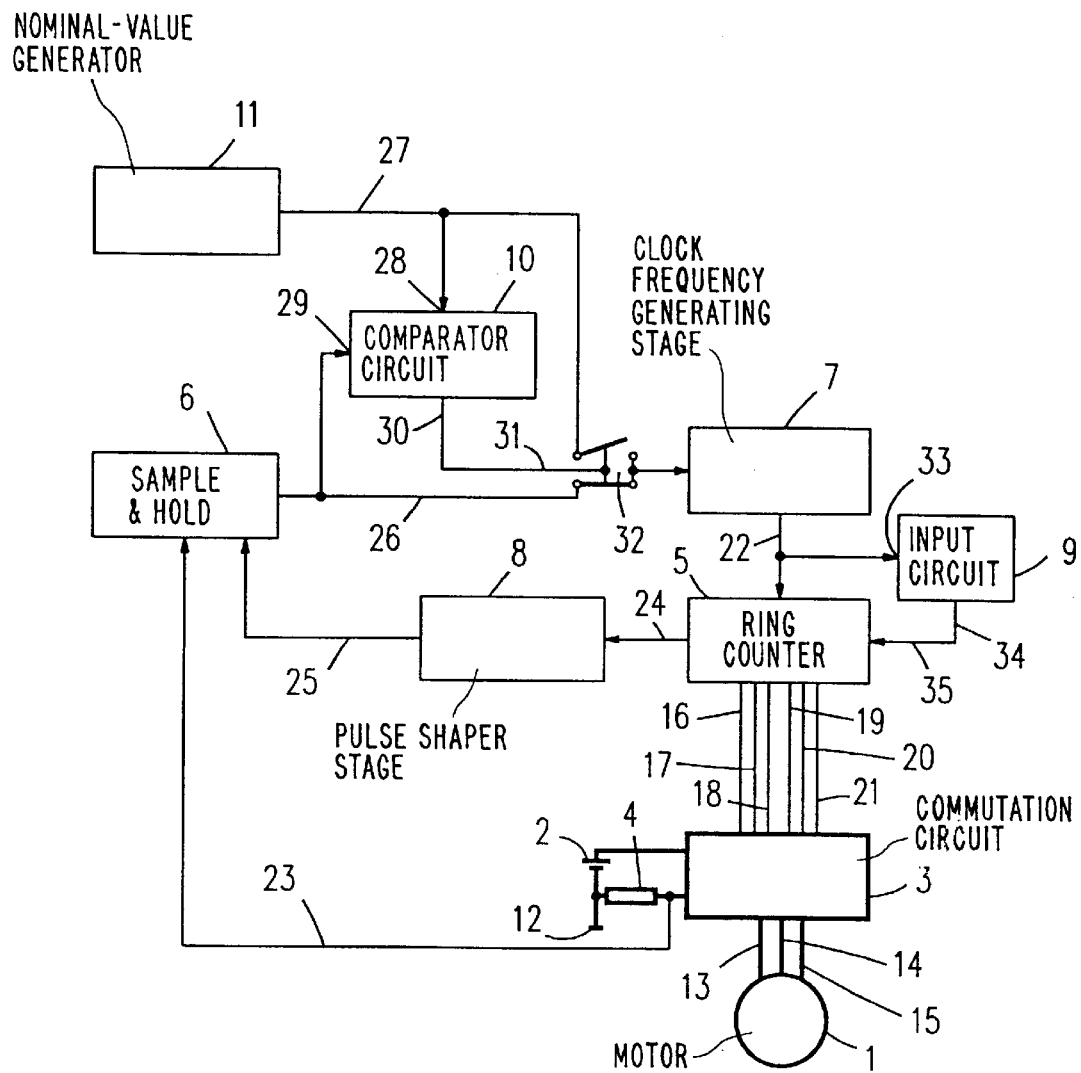
FIG. 1 shows a block diagram of a first embodiment of the invention.

The first embodiment of the invention shown in the block diagram of FIG. 1 comprises an electric motor 1, which has for example three windings and which is powered by means of a direct voltage source 2, for example a battery or a rechargeable battery, and is therefore connected to this voltage source via a commutation circuit 3. The circuit elements and lines which serve for the power supply of the electric motor 1 are shown in heavier lines than the circuit elements and lines which serve for the signal transfer, i.e. the information transfer, in the circuit arrangement in accordance with the invention. One of the lines between the direct voltage source 2 and the commutation circuit 3 includes a measurement impedance 4, preferably a resistor having a low resistance. A node between the direct voltage source 2 and the measurement impedance 4 is connected to ground 12.

By means of the commutation circuit 3 the winding terminals 13, 14 and 15 of the electric motor 1 can be connected selectively to the first terminal of the direct voltage source—in the present case the battery—or, via the measurement impedance 4, to the second terminal of the direct voltage source—in the present case the negative terminal. In operation of the electric motor this is effected at given instants or in given time intervals in such a manner that this causes the armature of the electric motor to be set into rotation.

In order to control the switching operations necessary for this commutation of the electric motor 1, the commutation circuit 3 is connected to a ring counter device 5 via switching lines 16 to 21. A clock signal from a clock frequency generating stage 7 is applied to the ring counter device 5 and causes a presettable signal series to be cycled through the ring counter device 5. One period of the ring counter device 5 then corresponds to one complete cycle of said signal series through the ring counter device 5 or to one revolution of the rotor of the electric motor 1. The clock signal is applied from the clock frequency generating stage 7 to the ring counter device 5 via a clock line 22.

The embodiment shown in FIG. 1 further comprises a sample and hold circuit 6 which, via a measurement value line 23, is connected to the measurement impedance 4 at the end which is remote from the line connected to ground 12. The measurement voltage produced across the measurement impedance 4 is applied to the sample and hold circuit 6 via the measurement value line 23. The sample and hold circuit 6 is further connected to the ring counter device 5 via a pulse shaper stage 8. As will be described in more detail hereinafter, a signal which is correlated to the signals on the switching lines 16 to 21 and to the signal on the clock line 22 is then taken from the ring counter device 5 at an appropriate position via a line 24. The pulse shaper stage 8 shapes this signal into a pulse-shaped sampling signal, which is applied to the sample and hold circuit 6 via a sampling signal line 25. When a pulse in this sampling signal appears, the instantaneous value of the measurement voltage on the measurement value line 23 is sampled and stored in the sample and hold circuit 6 for further processing.

The value of the measurement voltage stored in the sample and hold circuit 6 is applied to the clock frequency generating stage 7 via a further line 26 to control the clock frequency in this stage in dependence on the measurement voltage. A control loop for the commutation of the electric motor 1 is closed by the line 26.

To control the speed of the electric motor 1 at a presettable nominal value the circuit arrangement shown in FIG. 1 further includes a nominal-value generator 11 which can supply a nominal current value—preferably in the form of a direct voltage. This nominal current value is applied to a nominal value input 28 of a comparator circuit 10 via a line, which comparator circuit has an actual value input 29, to which the measurement value stored in the sample and hold circuit 6 is applied from the line 26. A switching signal, which assumes a value corresponding to the result of the comparison, is applied from the output 30 of the comparator circuit 10 to a control input 31 of a switching stage 32. The switching stage 32 is switched over in accordance with the signal on its control input 31 in such a manner that selectively the nominal current value is applied to the clock frequency generating stage 7 via the line 27 or the measurement voltage is applied to this stage via the line 26. As long as the measurement voltage on the line 26 has a higher value than the nominal current value (i.e. the direct voltage representing it) on the line 27, the switching stage 32 is in the switching state shown in FIG. 1, in which there is a connection between the sample and hold circuit 6 and the clock frequency generating stage 7.

The circuit arrangement shown in FIG. 1 further includes an input circuit 9 having an input 33, to which the signal from the clock line 22 is applied, and having an output 34, which is connected to a further input 35 of the ring counter device 5. The input circuit stores at least one presettable signal series. When the circuit arrangement is put into operation, i.e. when power is supplied to start the electric motor 1, this signal series is loaded into the ring counter device 5 with the aid of the signal on the clock line 22. By selectively loading different signal series stored in the input circuit 9 it is possible to establish different torque-speed relationships for the operation of the electric motor 1. This will be explained with reference to FIGS. 3 and 4.

Figure 2:
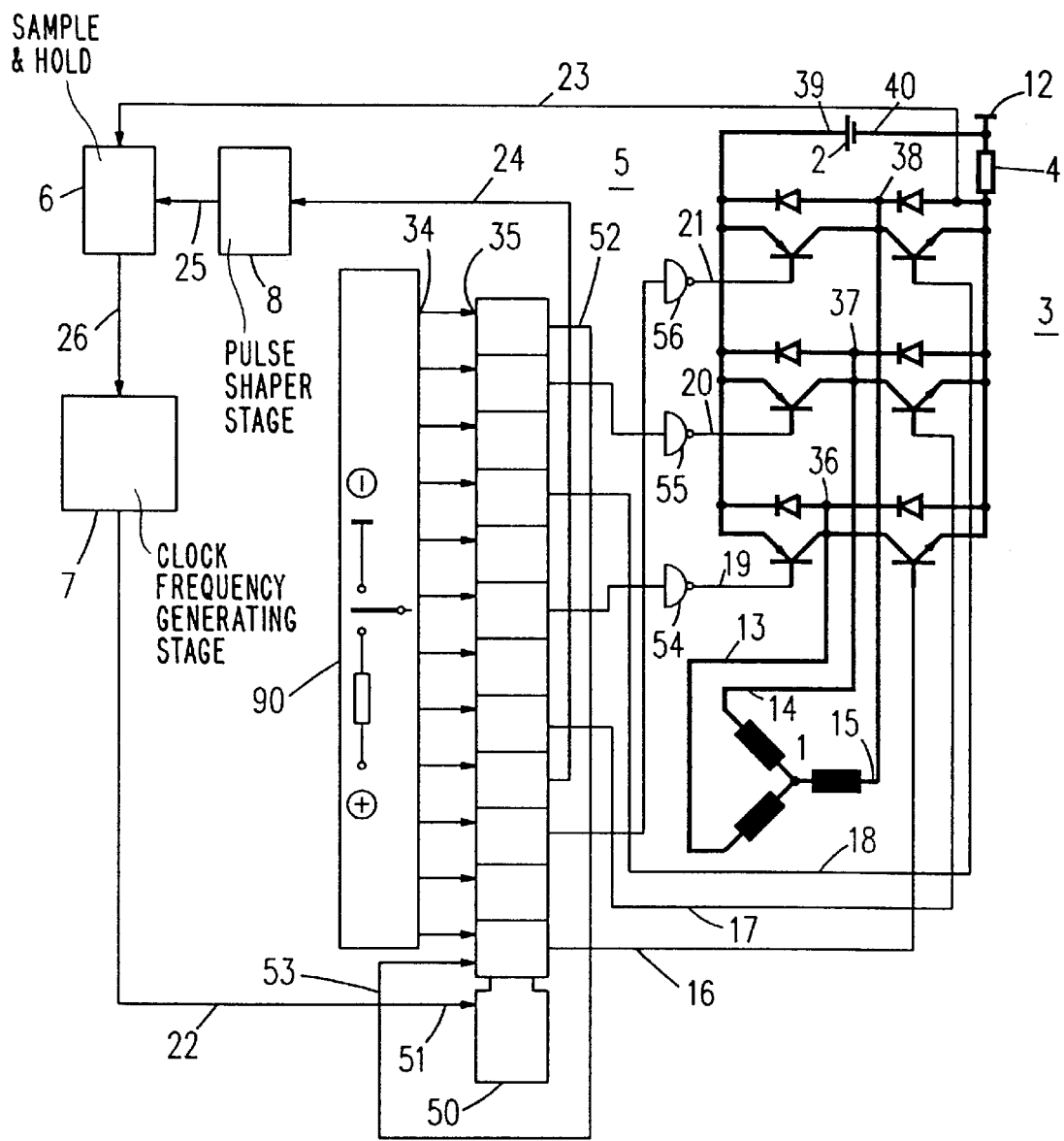
FIG. 2 shows a block diagram of a second embodiment of the invention.

FIG. 2 shows a further embodiment of the circuit arrangement in accordance with the invention, in which the commutation circuit 3 and the ring counter device 5 are shown in detail. To simplify the Figure the embodiment shown in FIG. 2 is shown without the control stage 10, 11, 32 and the input circuit, which bears the reference numeral 90, is shown in simplified form in FIG. 2.

The commutation circuit 3 shown in FIG. 2 has a commutation branch 36, 37 and 38, respectively, for each of the winding terminals 13, 14, 15 of the electric motor 1. Each of the commutation branches 36, 37 and 38 is arranged between a first terminal 39 of the direct voltage source 2—in the present case the positive terminal—and, via the measurement impedance 4, to the second terminal 40 of the direct voltage source 2—in the present case the negative terminal—as well as ground. Each of the commutation branches 36, 37, 38 includes a first switching element, by which the respective winding terminal 13, 14, 15 can be connected to the first terminal 39 of the direct voltage source 2. Each of these first switching elements of the commutation branches 36, 37, 38 comprises the parallel arrangement of a pnp transistor and a freewheel diode. Likewise, the commutation branches 36, 37, 38 each include a second switching element for connecting the winding terminals 13, 14 and 15, respectively, to the second terminal 40 of the direct voltage source 2 via the measurement impedance 4, each of said second switching elements comprising the parallel arrangement of an npn transistor and a further freewheel diode.

The ring counter device 5 in FIG. 2 is formed by means of a shift register 50 which comprises a number of register cells corresponding to twice the number of switching elements of the commutation circuit 3, i.e. there are twelve register cells. A signal series stored in these register cells is cycled through the register cells under control of a clock signal on a common clock signal input 51, for which purpose the last register cell has an output 52 connected to an input 53 of the first register cell. The clock signal input 51 of the shift register 50 is connected to the clock line 22. Thus, the signal series in the shift register 50 is clocked by the clock signal derived from the motor current.

FIG. 2 further shows a simple example of an input circuit, which bears the reference numeral 90. The output 34 of the input circuit 90 in FIG. 2 has a connection to the shift register 50 for each of the register cells; likewise, the shift register 50 has a connection to the input 35 for each of its register cells. For each individual register cell the input circuit 90 can preset a binary signal value corresponding to one of the possible switching states of the register cells of the shift register 50. This is shown diagrammatically as a mechanical change-over switch between a positive and a negative potential (ground). The selectable signal series can be loaded into the shift register 50 by the input circuit 90. In this way, different commutation sequences for the electric motor 1 can be selected, which lead to different torque-speed relationships. Thus, the modes of operation of the electric motor 1 can be varied by selecting different signal series.

In the shift register 50 every second register cell has an output connected to one of the switching lines 16 to 21. In particular, the first register cell has an output connected to the switching line 16 for the second switching element of the commutation branch 36. An output of the fifth register cell leads to the switching line 17 for the second switching element of the commutation branch 37, and an output of the ninth register cell is connected to the switching line 18 for the second switching element of the commutation branch 38. Furthermore, an output of the seventh register cell is connected to a first inverter 54, an output of the eleventh register cell is connected to a second inverter 55, and an output of the third register cell is connected to a third inverter 56. Outputs of the first, the second and the third inverter 54, 55, 56 lead to the first switching elements of the commutation branches 36, 37 and 38, respectively. In this way, the signals from the outputs of the register cells are applied directly to the second switching elements and are applied in inverted form to the first switching elements of the commutation circuit 3. Furthermore, in the present shift register 50 a time interval between every two successive switching operations of the switching elements of the commutation circuit 3 corresponds to two periods of the clock signal on the clock line 22.

The fourth register cell of the shift register 50 has an output connected to the line 24 which leads to the pulse shaper stage 8. Thus, a sampling signal is taken from the fourth register cell and is applied to the sample and hold circuit 6 via the sampling signal line 25. In this way, the activation of the sample and hold circuit 6 is started by an edge of the clock signal within a time interval between every two successive switching operations of the switching elements of the commutation circuit 3.

The commutation of the electric motor 1 can be refined or varied further in that the number of register cells of the shift register 50 is made to correspond to n times the number of switching elements, n being an integer greater than 2. This means, in other words, that n is the quotient of the number of register cells and the number of switching elements, and every $n^{th}$ register cell of the ring counter device 5 is connected to one of the switching elements of the commutation circuit 3. The sampling signal for starting a sampling operation in the sample and hold circuit 6 is then taken from one of the register cells which is situated in the shift register between two successive register cells which are each connected to one of the switching elements of the commutation circuit 3. When the shift register is thus modified a different instant can be selected for the sampling operation between two switching operations of the switching elements of the commutation circuit 3 and may thus be adapted to the process cycles performed in the commutation circuit.

Figure 3:
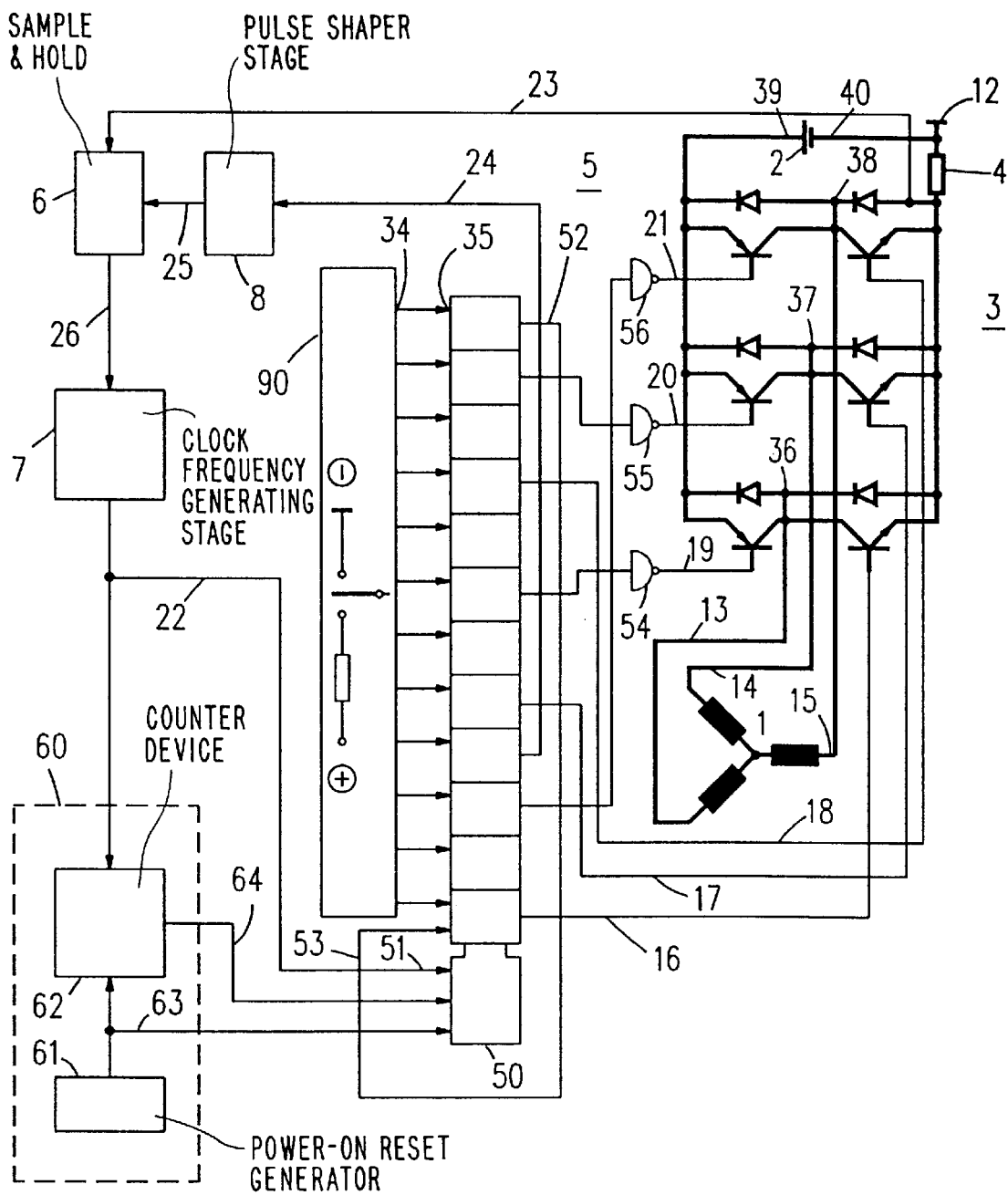
FIG. 3 shows a modification of the embodiment shown in FIG. 2.

FIG. 3 shows a variant of the embodiment shown in FIG. 2, in which the input circuit 90 is completed with a starting circuit 60. Preferably, an input circuit 9 shown in FIG. 1 combines the input circuit 90 of FIGS. 2 and 3 with the starting circuit 60. The starting circuit 60 serves for controlling the input of the presettable signal series into the shift register 50 when the electric motor 1, or the circuit arrangement of FIG. 3 by which the motor is controlled, is put into operation. For this purpose, the starting circuit 60 comprises a power-on reset generator 61 and a counter device 62. When the power supply is turned on the power-on reset generator 61 supplies a non-recurrent power-on reset pulse and is inoperative during the subsequent operating time of the circuit arrangement. By means of this power-on reset pulse both the shift register 50 and the counter device 62 are reset to an initial state via a reset line 63.

When the power supply to the other parts of the circuit arrangement, particularly to the clock frequency generating stage 7 and the commutation circuit 3, is turned on the circuit arrangement is put operation insofar as the clock frequency generating stage 7 supplies clock pules via the clock line 22. By means of these clock pulses, which reach the counter device 62 via a connection to the clock line 22, the counter device 62 is clocked from its initial state to a presettable final count and this final count is maintained for the subsequent operating time of the electric motor. When the final count is reached the counter device 62 supplies an input signal to the shift register 50 via an input control line 64, upon which the preset signal series in the input circuit 90 is loaded into the shift register 50 via the input 35. In response to further clock pulses on the clock line 22 this preset signal series is then cycled through the shift register 50 so as to cause the desired commutation of the electric motor 1.

Figure 4:
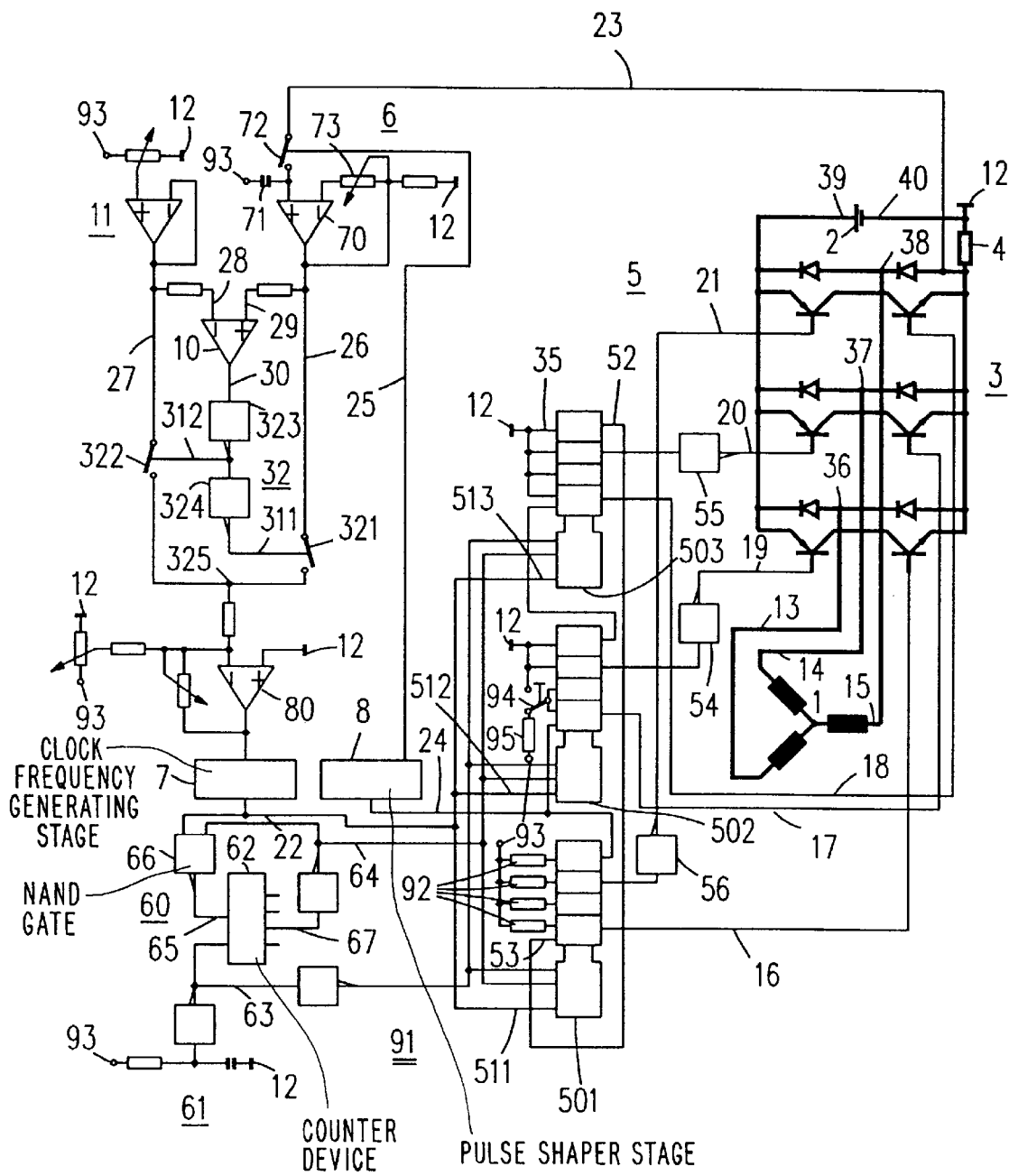
FIG. 4 shows a third embodiment of the invention.

FIG. 4 shows a more detailed example of the circuit arrangement in accordance with the invention. In the present embodiment the ring counter device 5 comprises three shift registers 501, 502, 503 each having one third of the total number of register cells. For cycling through of the preset signal series the register cells of all the shift registers 501, 502, 503 are arranged in series in the same way as the register cells of the shift register 50 of the embodiment shown in FIG. 2 or 3. So far, the combination of the shift registers 501, 502, 503 operates similarly to the shift register 50. The shift registers 501, 502, 503 are clocked synchronously via clock signal inputs 511, 512 and 513, respectively.

The embodiment shown in FIG. 4 includes an input circuit 91 which comprises the starting circuit 60 and a simplified version of the input circuit referenced 90 in FIGS. 2 and 3. This simplified input circuit 91 shown in FIG. 4 is adapted to selectively preset two different signal series in the shift registers 501, 502, 503. For this purpose, the input terminals 35 of the ring counter device 5 for the individual register cells are connected as follows: The terminals for the first shift register 501 are connected to a positive supply voltage terminal 93 via series resistors 92; likewise, the input terminals 35 for the third shift register 503 are connected directly to ground 12; the input terminals 35 of the last two register cells of the second shift register 502 are also permanently connected to ground 12; the input terminals 35 for the first two register cells of the second shift register 502 are connected to one another and to a change-over switch 94 by which they can be connected selectively to ground 12 or, via a series resistor 95, to the positive supply voltage terminal 93. The two different signal series are selected by the change-over of the change-over switch 94. The power-on reset generator 61 in the starting circuit 60 included in the input circuit 91 comprises a series arrangement of a resistor and a capacitor between the positive supply voltage terminal 93 and ground. For the sake of simplicity, the power-on reset generator 61 in the present example has been connected to the same positive supply voltage terminal 93 as the series resistors 92, 95. Alternatively, the last-mentioned resistors may be connected to a reference potential derived from the voltage of the positive supply voltage terminal 93. This also applies to further connections made to the positive supply voltage terminal 93, to be described hereinafter.

A node between the resistor and the capacitor in the power-on reset generator 61 is connected to the reset line 63 via an inverter. In this way, it is achieved that when the starting circuit is put into operation the potential on the reset line 63 initially assumes a high value and, after the capacitor has been re-charged, it permanently assumes a low value.

The counter device 62 has its reset input connected to the reset line 63 and its count input 65 to the output of a NAND gate 66. An input of the NAND gate 66 is connected to the clock line 22 and a further input of the NAND gate is connected to the input control line 64. This control line is connected to a count output 67 of the counter device 22 via an inverter, on which output a positive potential appears when the counter device 62 reaches a preset count.

When the circuit arrangement is put into operation the counter device 62 is initially reset by the power-on reset generator 61 and is subsequently clocked by pulses on the clock line 22 until the count is reached at which the potential on the count output 67 changes. As a result of this, a further incrementation of the counter device 62 is inhibited via the NAND gate 66. At the same time, the input signal on the input control line is generated and applied to the shift registers 501, 502, 503. Subsequently, the preset potentials in accordance with the selected signal series are loaded into the register cells of these registers. After this, the starting circuit 60 is inoperative as in the case of FIG. 3.

The sample and hold circuit 6 in the embodiment shown in FIG. 4 comprises an operational amplifier 70 having its non-inverting input connected to the positive supply voltage terminal 93 via a storage capacitance 71 and also having its non-inverting input connected to the measurement line 23 via an analog switch 72 in order to apply the measurement voltage from the measurement impedance 4. The analog switch 72 is controlled by the sampling signal via the sampling signal line 25, i.e. the switch is rendered conductive when this signal appears; for the remainder of the time the analog switch 72 is blocked. The inverting input of the operational amplifier 70 is connected to ground 12 via a variable voltage divider 73. The variable voltage divider has a tap connected to the output of the operational amplifier 70 for the purpose of feedback.

In FIG. 4 the comparator circuit 10 included in the control stage is formed by a further operational amplifier whose inverting input constitutes the nominal value input 28 and whose non-inverting input constitutes the actual value input 29 of the comparator circuit 10. The inputs 28, 29 are connected to the lines 27 and 26, respectively, via a series resistor each, the line 26 being connected to the output of the operational amplifier 70 for the value of the measurement voltage from the sample and hold circuit 6 and the line 27 being connected to the output of a third operational amplifier, which forms the nominal value generator 11, for the direct voltage representing the nominal current value. The operational amplifier forming the nominal value generator 11 has feedback from its output to its inverting input. Its non-inverting input is coupled to the tap of a potentiometer whose end terminals are connected to the supply voltage terminal 93 and to ground 12, respectively. The nominal current value can be preset via this potentiometer.

The switching stage 32 in FIG. 4 comprises a first switch 321 via which the line 26 for the value of the measurement voltage can be connected to a circuit point 325. The line 27 for the direct voltage representing the nominal current value can also be connected to the circuit point 325 by means of a second switch 322. A first inverter 323 has its input connected to the output 30 of the comparator circuit 10 and has its output connected to the input of a second inverter 324. The output of the second inverter 324 is connected to a control input 311 of the first switch 321 and the output of the first inverter 323 is connected to a control input 312 of the second switch 322. In this way, the switches 321, 322 are changed over oppositely by the signal on the output 30 of the comparator circuit 10. As a result of this, either the measurement voltage from the line 26 or the nominal current value from the line 27 is applied to the circuit point 325. The switching stage 32 is changed over in dependence on the comparison between the value of the measurement voltage and the value of the direct voltage representing the nominal current value, in such a manner that the measurement voltage is applied to the circuit point 325 as long as it is higher than the direct voltage representing the nominal current value. Conversely, if the nominal value is higher than the measurement voltage the second switch 322 is closed and the first switch 321 is opened, as a result of which the nominal value is now applied to the circuit point 325.

In FIG. 4 a fourth operational amplifier is interposed between the switching stage 32 and the clock frequency generating stage 7, which operational amplifier has its inverting input connected to the circuit point 325 via a series resistor and has its output connected to the input of the clock frequency generating stage 7, via which input this stage receive the control voltage. This fourth operational amplifier, which bears the reference numeral 80, receives feedback from its output to its inverting input via a variable resistance. Furthermore, a connection leads from the inverting input to a tap of a further potentiometer via a series resistor, which potentiometer has its end terminals connected to the positive supply voltage terminal 93 and ground 12, respectively. The non-inverting input of the fourth operational amplifier 80 is coupled to ground 12.

At option, the potentiometer connected between ground 12 and the positive supply voltage terminal 93 in the wiring of the fourth operational amplifier 80 and the nominal value generator 11 may alternatively be connected to a terminal via which a suitably selected reference voltage can be applied, instead of to the positive supply voltage terminal. This enables the dimensioning of the present circuit arrangement to be varied. However, this variation is not relevant for the basic operation of the circuit arrangement and is therefore not shown. This also applies to the wiring of the change-over switch 94 by means of which the signal series to be loaded into the shift registers 501, 502, 503 can be set to a duty cycle of 1:2 or 1:1, as desired.

From the output of the fourth register cell of the shift register 501 there is not only a connection leading to an input of the first register cell of the shift register 502 but the line 24 also leads to the pulse shaper stage 8, which is preferably formed by a monostable multivibrator. The duration of the pulse supplied by this monostable multivibrator—upon a selected switching edge in the output signal of the of the fourth register cell of the shift register 501—has been selected so as to allow a well-defined charging process of the storage capacitance 71.

What is claimed is:

1. A circuit arrangement for powering an electric motor having at least three windings from a direct voltage source via a commutation circuit which, for each winding terminal of the electric motor, comprises a commutation branch including a first and a second switching element by which the relevant winding terminals are connected selectively to a first terminal of the direct voltage source or, via a measurement impedance, to a second terminal of the direct voltage source, the circuit arrangement comprising a ring counter device for periodically changing over the switching elements of the commutation circuit in accordance with a signal series which is cycled through the ring counter device under control of a clock signal, one period of the ring counter device corresponding to one complete cycle of the signal series through the ring counter device, a clock frequency generating stage for supplying the clock signal whose clock frequency is dependent on a measurement voltage, characterized in that a sample and hold circuit has an input coupled to the measurement impedance in order to sample the measurement voltage appearing across the measurement impedance and in that the ring counter device, in each of its periods, controls the sample and hold circuit so as to acquire a sampled value of the measurement voltage at a presettable instant outside the time interval for the change-over of the switching elements of the commutation circuit.

2. A circuit arrangement as claimed in claim 1, characterized in that the ring counter device comprises a shift register having a number of register cells which corresponds to at least twice the number of switching elements of the commutation circuit.

3. A circuit arrangement as claimed in claim 2, characterized in that a time interval between every two successive change-over operations of the switching elements of the commutation circuit corresponds to at least two periods of the clock signal, and the activation of the sample and hold circuit is started by an edge of the clock signal within said time interval.

4. A circuit arrangement as claimed in claim 2, characterized in that every $n^{th}$ register cell of the ring counter device is connected to one of the switching elements of the commutation circuit, n being the quotient of the number of register cells and the number of switching elements, and in that a sampling signal for starting a sampling operation in the sample and hold circuit is acquired from a register cell which, in the shift register, is situated between two successive register cells which are each connected to one of the switching elements of the commutation circuit.

5. A circuit arrangement as claimed in claim 4, characterized by a pulse shaper stage for acquiring a pulse-shaped sampling signal from the ring counter device.

6. A circuit arrangement as claimed in claim 1, characterized by an input circuit for storing at least one presettable signal series and for the non-recurrent input of this signal series into the ring counter device when the circuit arrangement is put into operation.

7. A circuit arrangement as claimed in claim 1, characterized in that the sample and hold circuit is connected to a control stage for controlling the speed of the electric motor at a presettable value, which can be applied to the control stage as a nominal current value, in that the control stage includes a comparator circuit for generating a comparison signal by comparing the nominal current value with the sampled values of the measurement voltage, and in that the comparison signal is applied to the clock frequency generating stage in order to derive the clock signal.

8. A circuit arrangement as claimed in claim 1 wherein the activation of the sample and hold circuit is started by an edge of the clock signal within a time interval between every two successful change-over operations of the switching elements of the commutation circuit.

9. A circuit arrangement as claimed in claim 8 characterized in that the ring counter device comprises a shift register wherein every $n^{th}$ register cell is connected to one of the switching elements of the commutation circuit, n being the quotient of the number of register cells and the number of switching elements, and in that a sampling signal for starting a sampling operation in the sample and hold circuit is acquired from a register cell which, in the shift register, is situated between two successive register cells which are each connected to one of the switching elements of the commutation circuit.

10. A circuit arrangement as claimed in claim 2, characterized by an input circuit for storing at least one presettable signal series and for the non-recurrent input of this signal series into the ring counter device when the circuit arrangement is put into operation.

11. A circuit arrangement as claimed in claim 8, characterized by an input circuit for storing at least one presettable signal series and for the non-recurrent input of this signal series into the ring counter device when the circuit arrangement is put into operation.

12. A circuit arrangement as claimed in claim 2, characterized in that the sample and hold circuit is connected to a control stage for controlling the speed of the electric motor at a presettable value, which can be applied to the control stage as a nominal current value, in that the control stage includes a comparator circuit for generating a comparison signal by comparing the nominal current value with the sampled values of the measurement voltage, and in that the comparison signal is applied to the clock frequency generating stage in order to derive the clock signal.

13. A circuit arrangement as claimed in claim 8, characterized in that the sample and hold circuit is connected to a control stage for controlling the speed of the electric motor at a presettable value, which can be applied to the control stage as a nominal current value, in that the control stage includes a comparator circuit for generating a comparison signal by comparing the nominal current value with the sampled values of the measurement voltage, and in that the comparison signal is applied to the clock frequency generating stage in order to derive the clock signal.

14. A circuit arrangement as claimed in claim 2 further comprising means coupled to a given register cell of the shift register for activating the sample and hold circuit by an edge of the clock signal within a time interval between every two successive change-over operations of the switching elements of the commutation circuit.

* * * * *